United States Patent
Xu et al.

(10) Patent No.: US 10,356,564 B2
(45) Date of Patent: Jul. 16, 2019

(54) METHOD AND APPARATUS FOR ENHANCING MBMS/SC-PTM PROCEDURES FOR V2X COMMUNICATION IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR); Hanbyul Seo, Seoul (KR); Youngdae Lee, Seoul (KR); Laeyoung Kim, Seoul (KR); Jonghyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 87 days.

(21) Appl. No.: 15/592,051

(22) Filed: May 10, 2017

(65) Prior Publication Data

US 2017/0332213 A1  Nov. 16, 2017

Related U.S. Application Data (60) Provisional application No. 62/334,454, filed on May 11, 2016.

(51) Int. Cl.
| | | |
|---|---|---|
| *H04W 4/08* | (2009.01) | |
| *H04L 5/00* | (2006.01) | |
| *H04W 76/40* | (2018.01) | |

(52) U.S. Cl.
CPC ............ *H04W 4/08* (2013.01); *H04L 5/0035* (2013.01); *H04W 76/40* (2018.02); *H04L 5/0053* (2013.01); *H04L 5/0078* (2013.01)

(58) Field of Classification Search
CPC ................................ H04W 4/08; H04W 76/40
See application file for complete search history.

(56) References Cited

U.S. PATENT DOCUMENTS

| | | | |
|---|---|---|---|
| 2016/0080163 A1* | 3/2016 | Taylor | H04L 12/189 370/312 |
| 2016/0285935 A1* | 9/2016 | Wu | H04W 4/90 |
| 2017/0367058 A1* | 12/2017 | Pelletier | H04W 56/0045 |

OTHER PUBLICATIONS

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description, Stage 2, Release 13," 3GPP TS 36.300 V13.2.0, Dec. 2015, 24 pages.

* cited by examiner

*Primary Examiner* — Kent K Krueger
(74) *Attorney, Agent, or Firm* — Lee Hong Degerman Kang & Waimey (57) ABSTRACT

A multi-cell/multicast coordination entity (MCE) determines a cluster to which a vehicle-to-everything (V2X) message. The MCE receives a first session start message, which includes a temporary mobile group identity (TMGI), quality of services (QoS) parameters, and a list of cells, from a V2X application server and determines a cluster, which contains group of cells, to which V2X message is to be broadcast, based on the received TMGI, QoS parameters, and list of cells. Upon determining the cluster, the MCE transmits a second session start message, which includes an indication to notify eNodeB (eNB) to wait for scheduling information, to eNBs corresponding to the determined cluster, and transmits MBMS scheduling information to the eNBs. Further, update of the cluster may be triggered from the V2X application server or from the eNB with limited feedback.

6 Claims, 9 Drawing Sheets

METHOD AND APPARATUS FOR ENHANCING MBMS/SC-PTM PROCEDURES FOR V2X COMMUNICATION IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/334,454, filed on May 11, 2016, the contents of which are hereby incorporated by reference herein in its entirety.

BACKGROUND OF THE INVENTION

Field of the Invention

The present invention relates to wireless communications, and more particularly, to a method and apparatus for enhancing multimedia broadcast multicast services (MBMS)/single-cell point-to-multipoint (SC-PTM) procedures for vehicle-to-everything (V2X) communication in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The pace of LTE network deployment is accelerating all over the world, which enables more and more advanced services and Internet applications making use of the inherent benefits of LTE, such as higher data rate, lower latency and enhanced coverage. Widely deployed LTE-based network provides the opportunity for the vehicle industry to realize the concept of 'connected cars'. By providing a vehicle with an access to the LTE network, a vehicle can be connected to the Internet and other vehicles so that a broad range of existing or new services can be envisaged. Vehicle manufacturers and cellular network operators show strong interests in vehicle wireless communications for proximity safety services as well as commercial applications. LTE-based vehicle-to-everything (V2X) study is urgently desired from market requirement, and the market for vehicle-to-vehicle (V2V) communication in particular is time sensitive. There are many research projects and field tests of connected vehicles in some countries or regions, such as US/Europe/Japan/Korea.

V2X includes a vehicle-to-vehicle (V2V), covering LTE-based communication between vehicles, vehicle-to-pedestrian (V2P), covering LTE-based communication between a vehicle and a device carried by an individual (e.g. handheld terminal carried by a pedestrian, cyclist, driver or passenger), and vehicle-to-infrastructure/network (V2I/N), covering LTE-based communication between a vehicle and a roadside unit (RSU)/network. A RSU is a transportation infrastructure entity (e.g. an entity transmitting speed notifications) implemented in an eNodeB (eNB) or a stationary UE.

SUMMARY OF THE INVENTION

The present invention relates to wireless communications, and more particularly, to a method and apparatus for enhancing multimedia broadcast multicast services (MBMS)/single-cell point-to-multipoint (SC-PTM) procedures for vehicle-to-everything (V2X) communication in a wireless communication system. The present invention provides a method and apparatus for determining a cluster to which a V2X message is broadcast. The present invention provides a method and apparatus for updating a cluster to which a V2X message is broadcast based on feedback information received from eNodeBs (eNBs).

In an aspect, a method for determining a cluster to which a vehicle-to-everything (V2X) message is to be transmitted by a multi-cell/multicast coordination entity (MCE), in a wireless communication system is provided. The method includes receiving a first session start message, which includes a temporary mobile group identity (TMGI), quality of services (QoS) parameters, and a list of cells, from a V2X application server, determining a cluster, which contains group of cells, to which V2X message is to be broadcast, based on the received TMGI, QoS parameters, and list of cells, transmitting a second session start message, which includes an indication to notify eNodeB (eNB) to wait for scheduling information, to eNBs corresponding to the determined cluster, and transmitting MBMS scheduling information to the eNBs.

In another aspect, a method for updating a cluster to which a vehicle-to-everything (V2X) message is to be transmitted by a multi-cell/multicast coordination entity (MCE), in a wireless communication system is provided. The method includes determining a first cluster, which contains a first group of cells, to which V2X message is to be broadcast based on a temporary mobile group identity (TMGI), quality of services (QoS) parameters, and a list of cells received from a V2X application server, transmitting first MBMS scheduling information to a first eNodeB (eNB), receiving feedback information on resource allocation based on the first MBMS scheduling information from the first eNB, determining a second cluster, which contains a second group of cells, to which a V2X message is to be broadcast based on the received feedback information, and transmitting second MBMS scheduling information to a second eNB.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
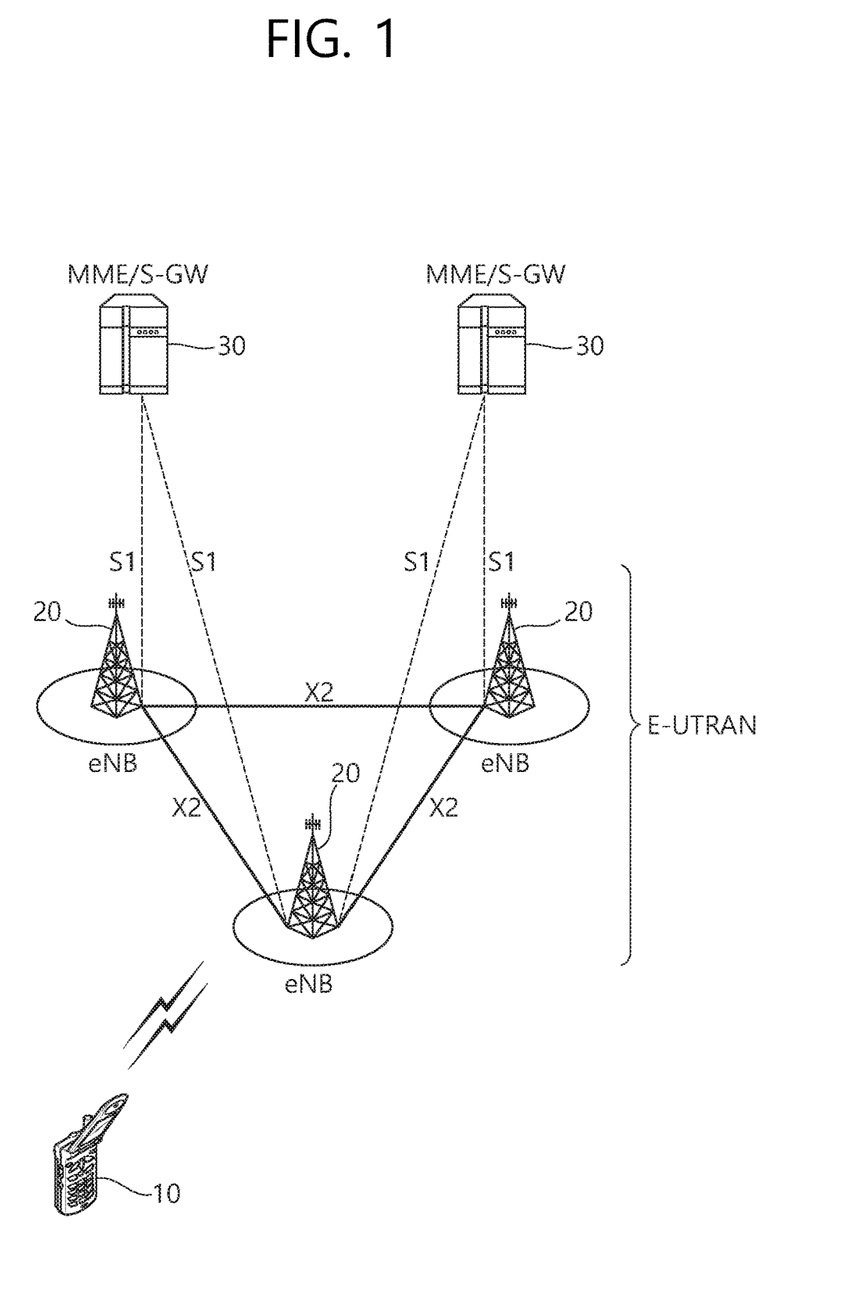
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Multimedia broadcast multicast services (MBMS) is described. It may be referred to as Section 15 of 3GPP TS 36.300 V13.2.0 (2015-12). For MBMS, the following definitions are introduced:

Multicast-broadcast single-frequency network (MBSFN) synchronization area: an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN Transmission or a transmission in MBSFN mode: a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN Area contribute to the MBSFN transmission and advertise its availability. The UE may only need to consider a subset of the MBSFN areas that are configured, i.e. when it knows which MBSFN area applies for the service(s) it is interested to receive.

MBSFN area reserved cell: A cell within a MBSFN area which does not contribute to the MBSFN transmission. The cell may be allowed to transmit for other services but at restricted power on the resource allocated for the MBSFN transmission.

Synchronization Sequence: Each SYNC protocol data unit (PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization Period: The synchronization period provides the time reference for the indication of the start time of each synchronization sequence. The time stamp which is provided in each SYNC PDU is a relative value which refers to the start time of the synchronization period. The duration of the synchronization period is configurable.

The MCE is a logical entity. This does not preclude the possibility that it may be part of another network element. The functions of the MCE are as follows.

The admission control and the allocation of the radio resources used by all eNBs in the MBSFN area for multi-cell MBMS transmissions using MBSFN operation. The MCE decides not to establish the radio bearer(s) of the new MBMS service(s) if the radio resources are not sufficient for the corresponding MBMS service(s) or may pre-empt radio resources from other radio bearer(s) of ongoing MBMS service(s) according to allocation and retention priority (ARP). Besides allocation of the time/frequency radio resources, this also includes deciding the further details of the radio configuration e.g. the modulation and coding scheme.

Deciding on whether to use single-cell point-to-multipoint (SC-PTM) or MBSFN.

Counting and acquisition of counting results for MBMS service(s).

Resumption of MBMS session(s) within MBSFN area(s) based on, e.g. the ARP and/or the counting results for the corresponding MBMS service(s).

Suspension of MBMS session(s) within MBSFN area(s) based on, e.g. the ARP and/or on the counting results for the corresponding MBMS service(s).

The MCE is involved in MBMS session control signaling. The MCE does not perform UE-MCE signaling. An eNB is served by a single MCE.

The MBMS gateway (GW) is a logical entity. This does not preclude the possibility that it may be part of another network element. The MBMS GW is present between the BMSC and eNBs whose principal functions is the sending/broadcasting of MBMS packets to each eNB transmitting the service. The MBMS GW uses IP multicast as the means of forwarding MBMS user data to the eNB. The MBMS GW performs MBMS session control signaling (session start/update/stop) towards the E-UTRAN via MME.

Transmission of a MBMS in E-UTRAN uses either MBSFN transmission or SC-PTM transmission. The MCE makes the decision on whether to use SC-PTM or MBSFN for each MBMS session.

Single-cell transmission of MBMS (i.e. SC-PTM transmission) is characterized by:

MBMS is transmitted in the coverage of a single cell;
One single-cell multicast control channel (SC-MCCH) and one or more single-cell multicast traffic channel(s) (SC-MTCH(s)) are mapped on downlink shared channel (DL-SCH);
Scheduling is done by the eNB;
SC-MCCH and SC-MTCH transmissions are each indicated by a logical channel specific radio network temporary identity (RNTI) on physical downlink control channel (PDCCH) (there is a one-to-one mapping between temporary mobile group identity (TMGI) and group RNTI (G-RNTI) used for the reception of the DL-SCH to which a SC-MTCH is mapped);
A single transmission is used for DL-SCH (i.e. neither blind hybrid automatic repeat request (HARQ) repetitions nor radio link control (RLC) quick repeat) on which SC-MCCH or SC-MTCH is mapped.

Multi-cell transmission of MBMS (i.e. MBSFN transmission) is characterized by:

Synchronous transmission of MBMS within its MBSFN area;
Combining of MBMS transmission from multiple cells is supported;
Scheduling of each multicast channel (MCH) is done by the MCE;
A single transmission is used for MCH (i.e. neither blind HARQ repetitions nor RLC quick repeat);
A single transport block (TB) is used per transmission time interval (TTI) for MCH transmission, that TB uses all the MBSFN resources in that subframe;
MTCH and MCCH can be multiplexed on the same MCH and are mapped on MCH for p-t-m transmission;
The media access control (MAC) subheader indicates the logical channel identity (LCID) for MTCH and MCCH;
The MBSFN synchronization area, the MBSFN area, and the MBSFN cells are semi-statically configured e.g. by operation and maintenance (O&M);
MBSFN areas are static, unless changed by O&M (i.e. no dynamic change of areas).

Multiple MBMS services can be mapped to the same MCH and one MCH contains data belonging to only one MBSFN area. An MBSFN area contains one or more MCHs. An MCH specific modulation and coding scheme (MCS) is used for all subframes of the MCH that do not use the MCS indicated in broadcast control channel (BCCH). All MCHs have the same coverage area.

Vehicle-to-everything (V2X) communication is described. V2X communication contains three different types, which are vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and V2N service. V2V service is a type of V2X service, where both parties of the communication are UEs using V2V application. V2I service is a type of V2X Service, where one party is a UE and the other party is a road side unit (RSU) both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

For V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X Service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X service, e.g., RSU, application server, etc.

For V2I, the UE supporting V2I applications sends application layer information to RSU. RSU sends application layer information to a group of UEs or a UE supporting V2I applications. V2N is also introduced where one party is a UE and the other party is a serving entity, both supporting V2N applications and communicating with each other via LTE network.

For V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X Service. The UE supporting V2P applications transmits application layer information. Such information can be broadcast by a vehicle with UE supporting V2X service (e.g., warning to pedestrian), and/or by a pedestrian with UE supporting V2X service (e.g., warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

There may be three types of UE for V2X communication, one of which is a vehicle UE, the second is a RSU UE, and the last is a pedestrian UE. The vehicle UE may be like the generic UE. The RSU UE is a RSU which is implemented in the UE, and can relay or multicast or broadcast the traffic or safety information or other vehicle UEs. The pedestrian UE is a UE supporting V2X communication which is carried by a pedestrian, cyclist, driver or passenger. For V2X communication, vehicle UEs and pedestrian UEs may be communicated with each other directly via PC5 interface. Alternatively, vehicle UEs and pedestrian UEs may be communicated with each other indirectly via the network node. The network node may be one of an eNB, a new entity for V2X communication, a new gateway for V2X communication, a RSU, etc. The network node may not be the MME or S-GW. Alternatively, a vehicle UE or a pedestrian UE may broadcast data, and the RSU UE may receive the broadcast data. The RSU and another vehicle UE/pedestrian UE may be communicated with each other indirectly via the network node. The network node may be one of an eNB, a new entity for V2X communication, a new gateway for V2X communication, a RSU, etc. In this case, the network node may not be the MME or S-GW.

For V2X message transmission by the eNB supporting RSU/V2X function or eNB type RSU to other vehicle UEs or RSU UEs, resources should be allocated. Various resource allocation schemes have been discussed, and one scheme among the various resource allocation schemes is MBMS based resource allocation scheme.

Figure 2:
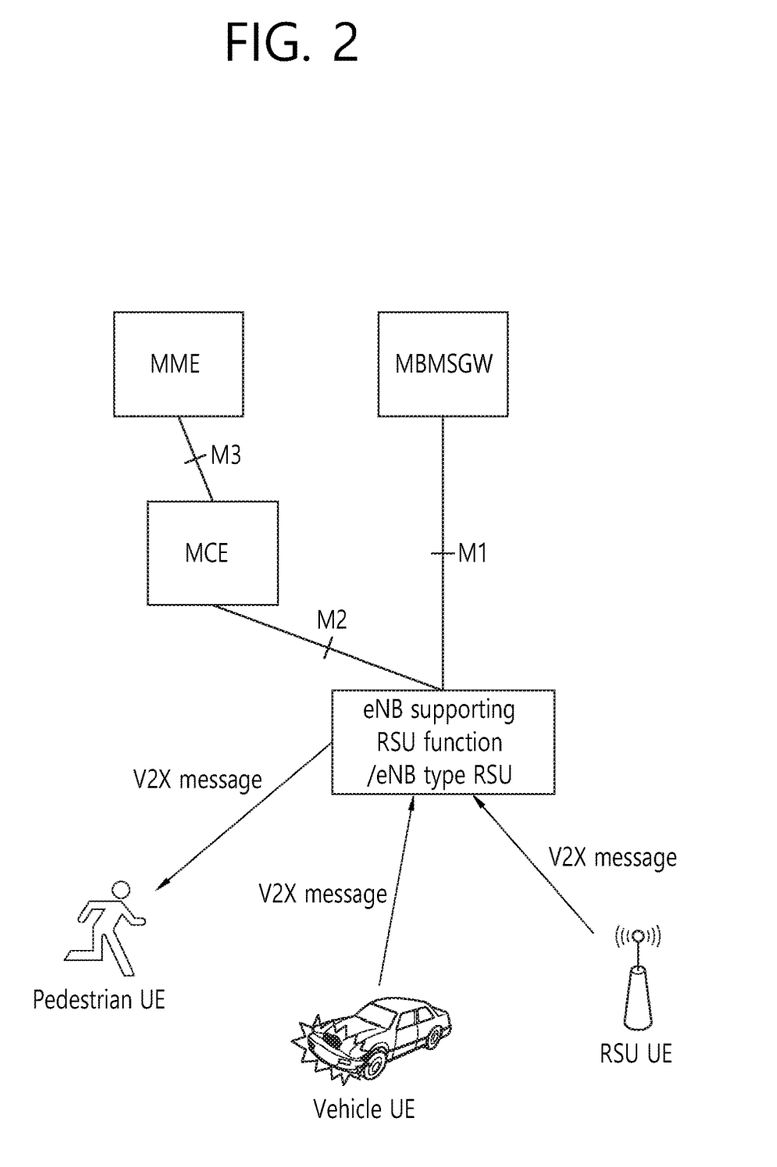
FIG. 2 shows an example of MBMS based architecture for V2X communication.

FIG. 2 shows an example of MBMS based architecture for V2X communication. Referring to FIG. 2, the vehicle UE/RSU UE/pedestrian UE may transmit V2X message to the eNB supporting RSU/V2X function or eNB type RSU. The eNB supporting RSU/V2X function or eNB type RSU may broadcast the received V2X message to other vehicle UEs/RSU UEs/pedestrian UEs. Further, the eNB supporting RSU/V2X function or eNB type RSU may connected with MBMS GW via M1 interface and connected with MCE via M2 interface. The MCE may be connected with MME via M3 interface. In the description above, the network nodes, i.e. eNB supporting RSU/V2X function, eNB type RSU, MCE, or MME, may be replaced with a new name. Further, the interface between the network nodes may be a new interface.

As described above, MBMS may be used to support V2X services. There may be some observations on the performance benefit with the following enhancement to DL multicast/broadcast:

Dynamic scheduling for multicast/broadcast transmissions, i.e., PDCCH-based scheduling of TBs associated to a temporary mobile group identity (TMGI)

Semi-static scheduling for multicast/broadcast transmissions

Use of demodulation reference signal (DM-RS) based transmission scheme from multiple transmission points (TPs) including reception for idle UEs (This does not imply introduction of any new transmission mode (TM))

DMRS-based single-cell multicast

Physical downlink shared channel (PDSCH) transmitted from multiple TPs

Cell-specific reference signal (CRS) based PDSCH/PDCCH transmitted from TP(s) that differ from the TP(s) transmitting the system information DMRS based PDSCH/enhanced PDCCH (EPDCCH) transmitted from different TP(s)

Use of normal cyclic prefix (CP)

HARQ feedback

CSI feedback

In the current MBMS system, it is challenging to meet the DL capacity requirement on V2V service. To overcome the challenges, based on the above observations, both MBSFN transmissions and SC-PTM transmissions may be enhanced in terms of capacity and latency for Uu transport of V2V services. Specifically, it may be observed that DL broadcast over PDSCH from different TP sets is beneficial for support of V2V service from capacity point of view. In order to apply the concept of DL broadcast, i.e. MBSFN/SC-PTM transmission, from different TP sets and realize the performance benefit, the enhancement may be needed for the MBSFN/SC-PTM procedure, especially from view point of MCE and eNB.

Hereinafter, the present invention provides an enhancement for MBMS procedure, i.e. MBSFN/SC-PTM procedures, for the concept of DL broadcast from different TP sets.

Figure 3:
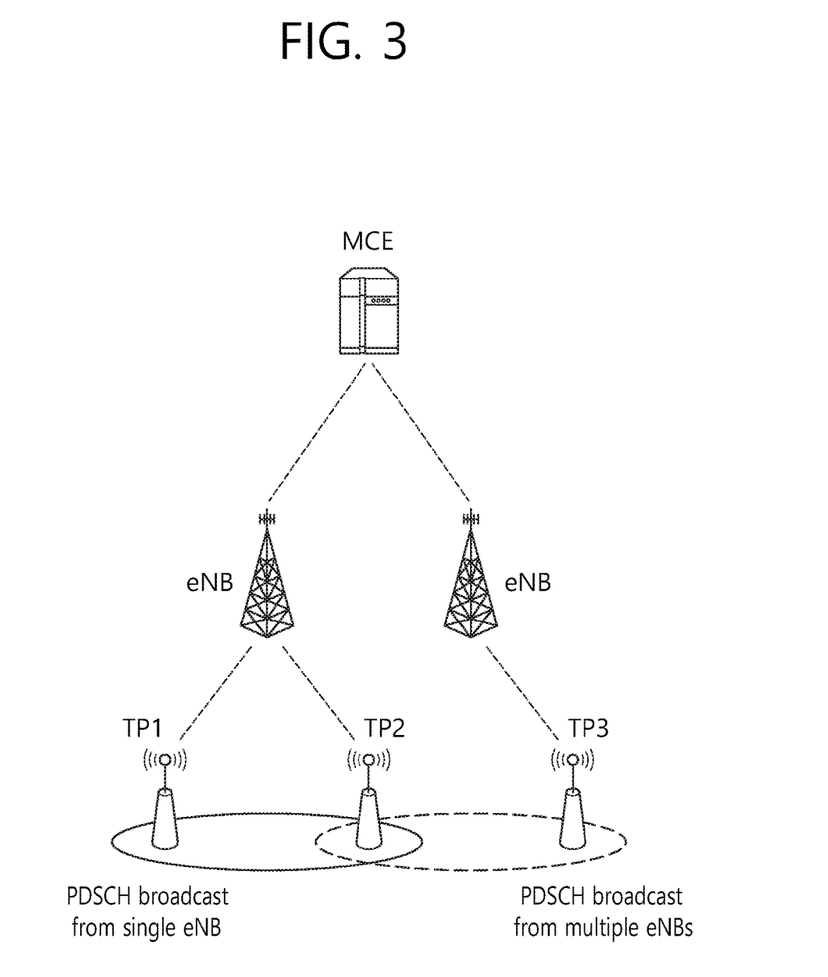
FIG. 3 shows an example of PDSCH broadcast transmission from multiple TPs according to an embodiment of the present invention.

FIG. 3 shows an example of PDSCH broadcast transmission from multiple TPs according to an embodiment of the present invention. DL broadcast over PDSCH from different TP sets may be beneficial for support of V2V service. A UE may receive PDSCH for broadcast from a set of TPs in one resource and from a different set of TPs in another resource. For each PDSCH transmission, the set of TPs may consist of one or multiple TPs. Multiple TPs may belong to the same cell or different cells. Referring to FIG. 3, when those TPs belong to different cells, the TPs may belong to the same eNB or different eNBs. From a UE viewpoint, a TP participating in PDSCH transmission for broadcast may or may not belong to its serving cell.

When multiple TPs belong to different eNBs, PDSCH broadcast may be scheduled by MCE, like in MBSFN transmission. That is, the MCE may periodically select time/frequency resources and MCS level for PDSCH broadcast for those eNBs. On the other hand, when multiple TPs belong to the same eNB, PDSCH broadcast may be scheduled by the eNB, like in SC-PTM transmission. That is, the eNB selects time/frequency resources and MCS level for PDSCH broadcast, e.g. if scheduling information is not provided by MCE.

PDCCH may be used to inform UEs about scheduled PDSCH broadcast regardless of whether those TPs belong to the same eNB or not. From a UE perspective, PDSCH broadcast from multiple TPs may be scheduled like SC-PTM. From a network perspective, MBSFN area concept may be used when PDSCH broadcasts from multiple cells. The MCE may coordinate which subframes participate in multiple cell PDSCH broadcast by utilizing the existing M2 signaling. This may be similar to configuration of MBSFN subframes. PDSCH broadcast from multiple TPs may be transmitted on any subframe i.e. not limited to MBSFN subframes only.

In the description below, for the sake of convenience, only a case that multiple TPs belong to different eNBs and PDSCH broadcast is scheduled by MCE is described. However, the present invention is not limited thereto, and the present invention may be applied to a case that multiple TPs belong to the same eNB and PDSCH broadcast is scheduled by the eNB.

Figure 4:
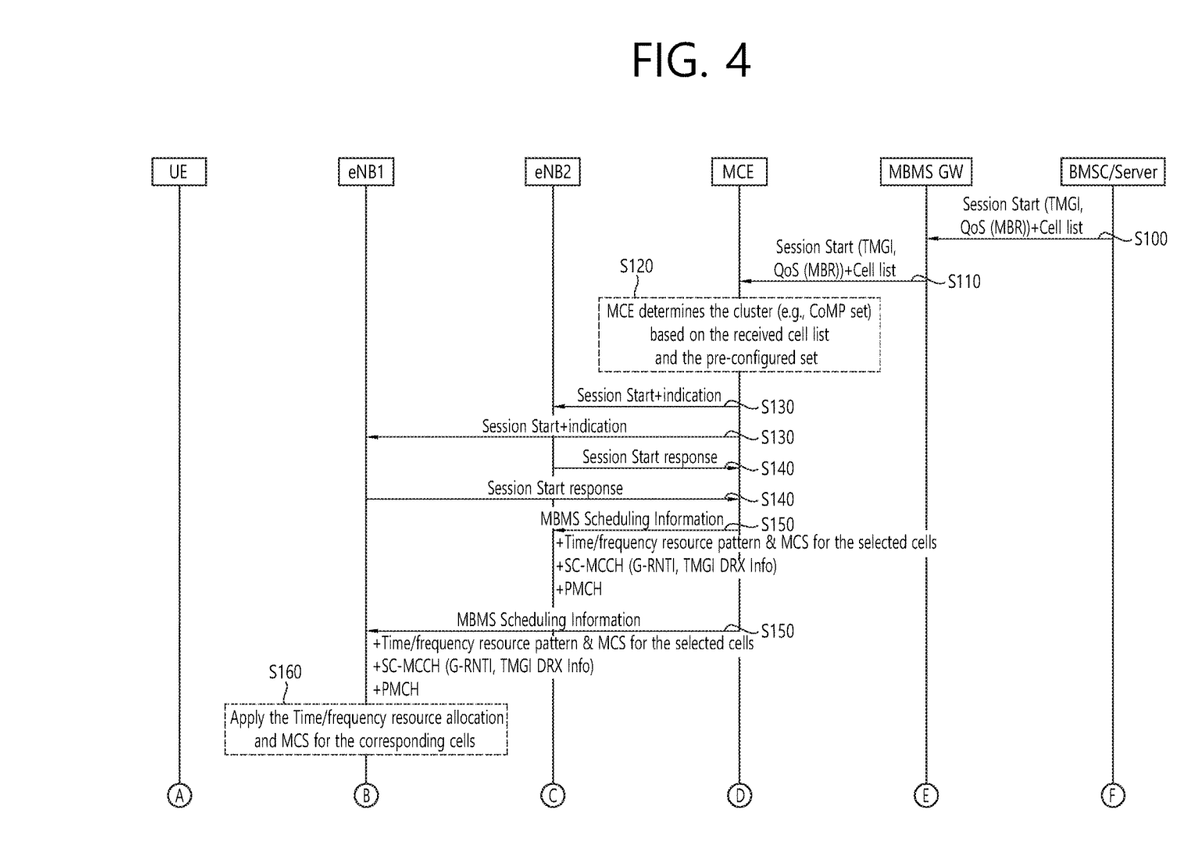
FIG. 4 and FIG. 5 show a MBMS procedure according to an embodiment of the present invention.
Figure 5:
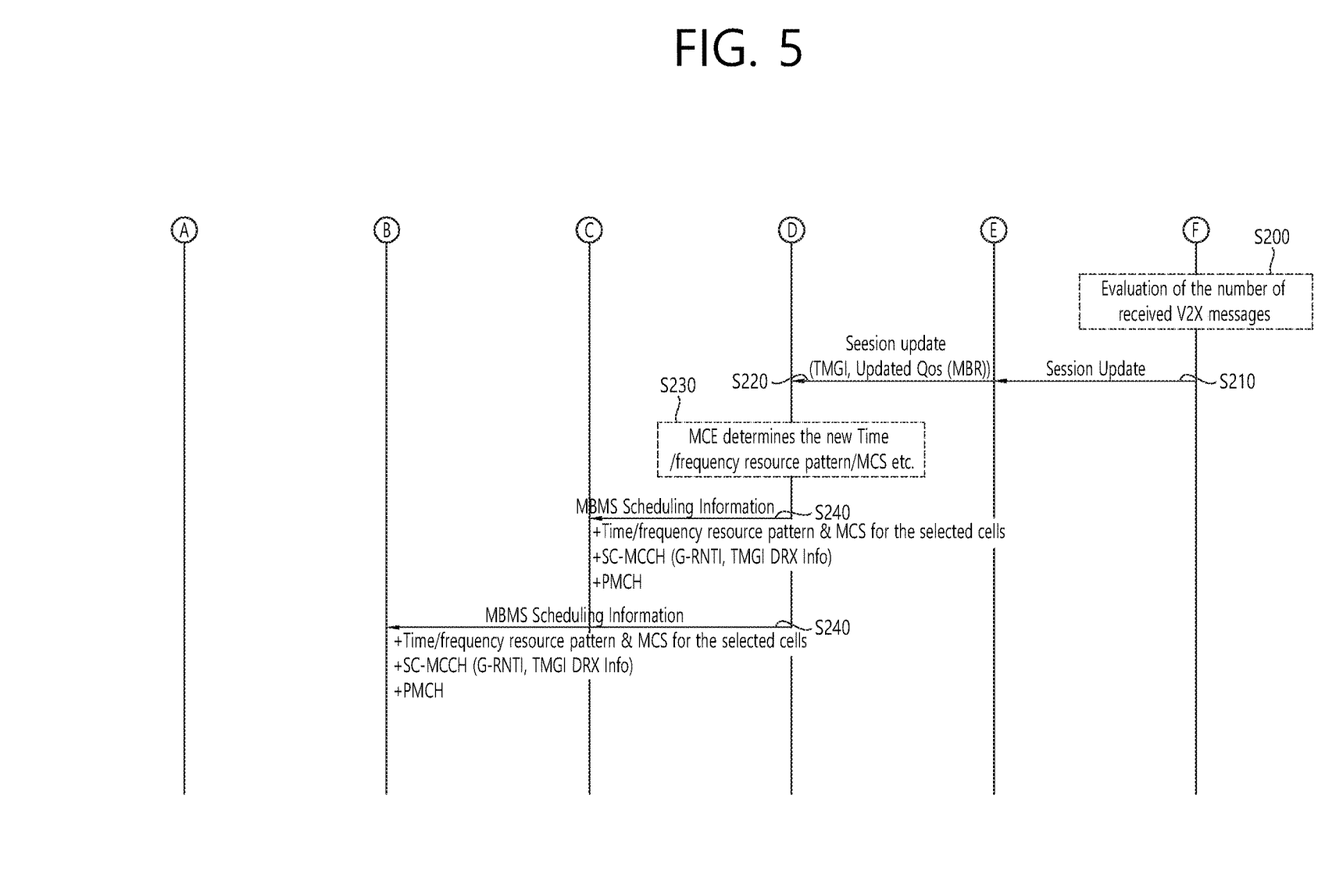

FIG. 4 and FIG. 5 show a MBMS procedure according to an embodiment of the present invention. In this embodiment, the MCE may coordinate a cluster, i.e. group of cells, in FIG. 4. Further, update of the cluster may be triggered from V2X application server in FIG. 5. The procedure shown in FIG. 5 is performed following the procedure shown in FIG. 4.

Referring to FIG. 4 first, in step S100, the BM-SC triggers a session start procedure after the BM-SC receives the request from the V2X application server. The BM-SC may transmit a session start message to the MBMS GW. The session start message may include at least one of TMGI, QoS parameters (e.g. maximum bit rate (MBR)) or a list of cells.

In step S110, upon receiving the session start message from the BM-SC, the MBMS GW forwards the session start message to the MCE.

In step S120, upon receiving the session start message from the MBMS GW, the MCE determines a cluster (i.e. a group of cells) to which V2X message is to be broadcast, based on the received list of cells and/or the pre-configured cell set. The MCE may determine the cluster further based on the received TMGI and QoS parameters. The cluster may correspond to coordinated multi-points (CoMP) set.

In step S130, upon determining the cluster, the MCE transmits a session start message to the corresponding eNBs, i.e. eNBs controlling the cells included in the cluster, based on the determination. The session start message may include an indication which notifies the corresponding eNBs to wait for the scheduling information from the MCE, instead of performing scheduling by the eNB itself. That is, the indication may have a meaning to let the corresponding eNB identify that the coordination is done by the MCE, not by the eNB.

In step S140, upon receiving the session start message from the MCE, the eNB gives the response, i.e. the session start response message, to the MCE.

In step S150, upon receiving the session start response message from eNBs, the MCE transmits MBMS scheduling information to the corresponding eNBs. The MBMS scheduling information message may include at least one of time/frequency resource pattern & MCS for the selected cells, information on SC-MCCH (G-RNTI, TMGI discontinuous reception (DRX) information), or information on physical multicast channel (PMCH).

In step S160, upon receiving the MBMS scheduling information message from the MCE, the eNB performs the MBSFN/SC-PTM radio related procedures with the received information. That is, the eNB may allocate time/frequency resources and MCS for the corresponding cells.

Referring to FIG. 5, which follows FIG. 4, update of scheduling information is described, which is triggered from the V2X application server.

In step S200, the V2X application server evaluates a number of received V2X messages, and decides if the session update should be triggered based on the number of V2X messages it has received.

In step S210, upon deciding that session should be updated, the V2X application server triggers the session update. The session update message is transmitted with the updated QoS (e.g. new MBR).

In step S220, upon receiving the session update message, the MBMS GW forwards the session update message to the MCE.

In step S230, upon receiving the session update message from the MBMS GW, the MCE decides the new time/frequency resource pattern and/or MCS.

In step S240, upon deciding the new time/frequency resource pattern and/or MCS, the MCE transmits the MBMS scheduling information to the corresponding eNBs. The MBMS scheduling information may include at least one of updated time/frequency resource pattern & MCS for the selected cells, information on SC-MCCH (G-RNTI, TMGI DRX information), or information on or PMCH.

Figure 6:
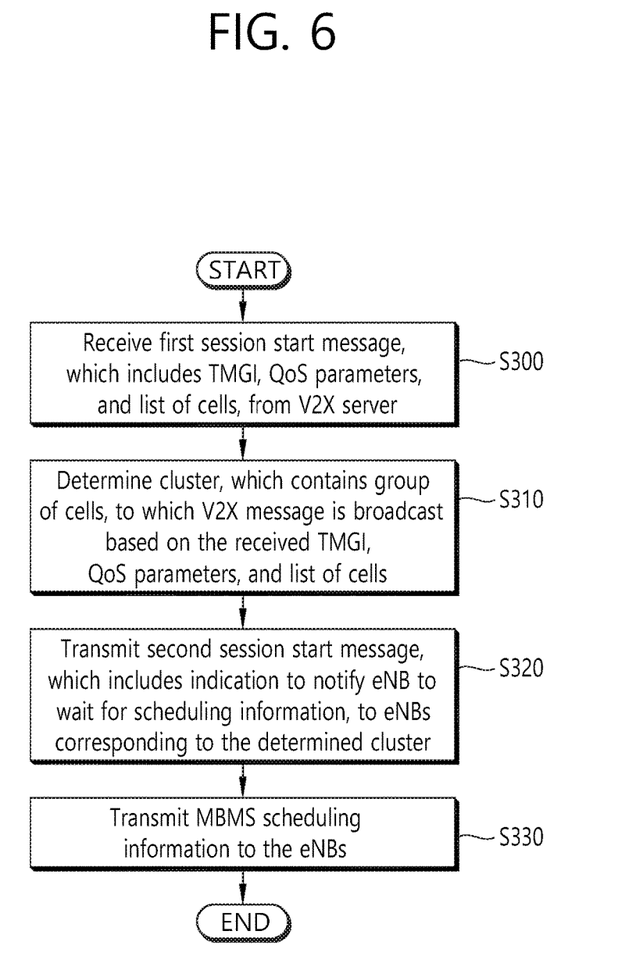
FIG. 6 shows a method for determining a cluster to which a V2X message is to be transmitted by MCE according to an embodiment of the present invention.

FIG. 6 shows a method for determining a cluster to which a V2X message is to be transmitted by MCE according to an embodiment of the present invention. The present invention described in FIG. 4 and FIG. 5 may be applied to this embodiment.

In step S300, the MCE receives a first session start message, which includes a TMGI, QoS parameters, and a list of cells, from a V2X application server. The QoS parameters may include a MBR.

In step S310, the MCE determines a cluster, which contains group of cells, to which V2X message is to be broadcast, based on the received TMGI, QoS parameters, and list of cells. The cluster may correspond to CoMP sets. The group of cells may belong to different eNBs. The cluster may be determined further based on a pre-configured cell set.

In step S320, the MCE transmitting a second session start message, which includes an indication to notify eNB to wait for scheduling information, to eNBs corresponding to the determined cluster. The MCE may receive a session start response message from the eNBs as a response to the second session start message.

In step S330, the MCE transmits MBMS scheduling information to the eNBs. The MBMS scheduling information may include at least one of time/frequency resource pattern and MCS for cells included in the cluster, information on SC-MCCH or information on PMCH. The MBMS scheduling information may be transmitted periodically.

Figure 7:
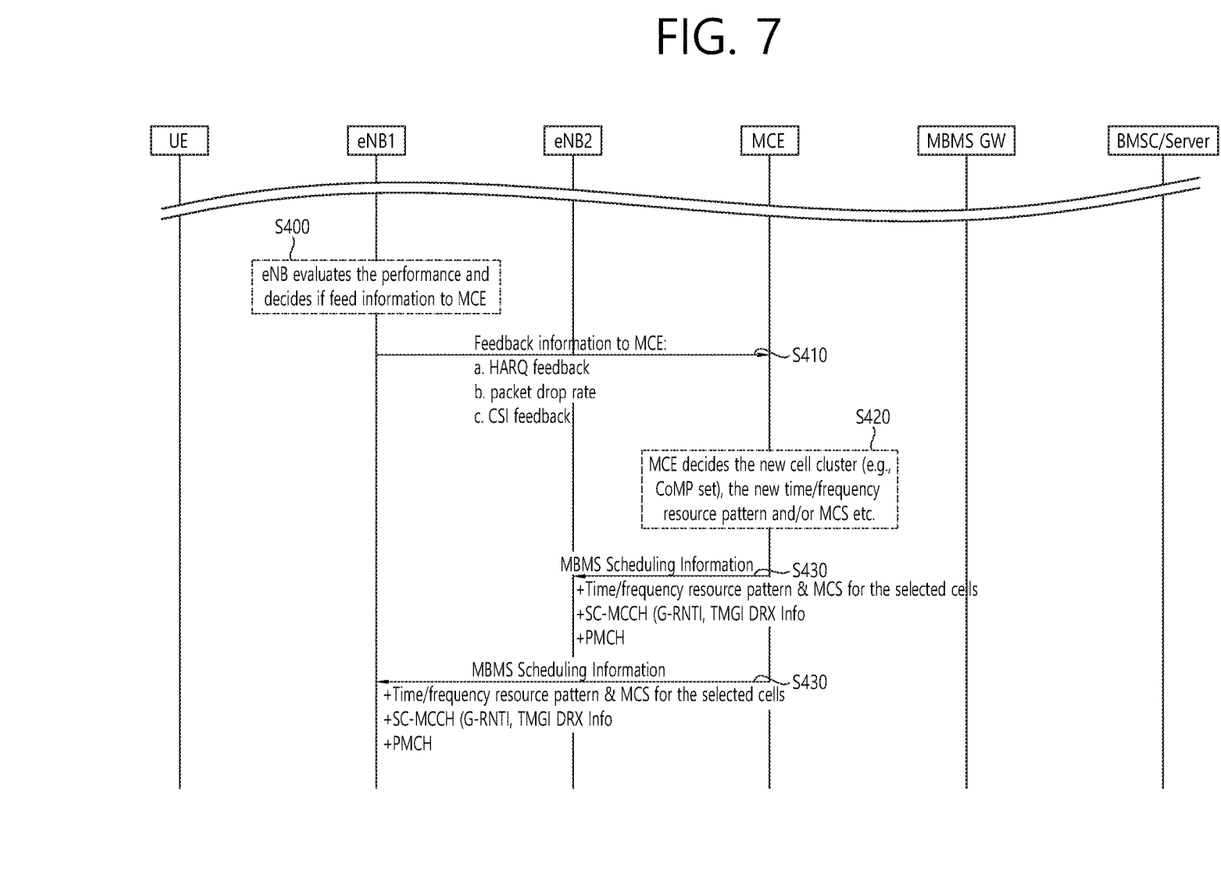
FIG. 7 show a MBMS procedure according to another embodiment of the present invention.

FIG. 7 show a MBMS procedure according to another embodiment of the present invention. In this embodiment, the MCE may coordinate a cluster, i.e. group of cells. This procedure is very similar to FIG. 4, so it is not shown here. That is, the MCE determines a cluster based on the list of cells, TMGI and QoS parameters received from the BM-SC/V2X application server, and allocated time/frequency resource and MCS for the corresponding cells included in the cluster. Further, update of the cluster may be triggered from the eNB with limited feedback in FIG. 7. The procedure shown in FIG. 7 is performed following the procedure shown in FIG. 4.

Referring to FIG. 7, in step S400, the eNB evaluates the performance and decides if feedback of information to the MCE is necessary or not in order to enhance the radio performance.

In step S410, if the eNB decides that feedback of information to the MCE is necessary, the eNB transmits at least one of the following elements of feedback information to the MCE. The feedback information may be transmitted via a new message or the existing message. The eNB may measure and report the following element per MBSFN area, per TMGI, per cluster, or per channel (e.g. MTCH, SC-MTCH, MCCH, SC-MCCH, DL-SCH, MCH, PDSCH or PMCH).

1) HARQ feedback (error rate related): The HARQ feedback may include the number of received NACKs. The eNB may increase this number by one whenever non-acknowledgement (NACK) to initial transmission or retransmission is received. Further, the HARQ feedback may include the number of failed transmission. The eNB may increase this number by one whenever retransmission is done up to the maximum number of retransmissions but acknowledgement (ACK) to retransmission is not received. For example, the average NACK probability observed in a certain time window may be reported. For another example, if HARQ-ACK feedback is UE-specific in the air interface, eNB may merge them into the cell-specific ACK/NACK in reporting to the MCE.

2) Packet drop rate measured within a period. The period may be one of MCCH/SC-MCCH modification period, MCCH/SC-MCCH repetition period, MCH scheduling period, or a period configured by operation & maintenance (O&M) or MCE. The packet drop rate may include the number of dropped service data units (SDUs) or protocol data units (PDUs) in L2 entity (e.g. packet data convergence protocol (PDCP), RLC or MAC) over the total number of SDUs or PDUs received from gateway (i.e. MBMS GW) within a period. The packet drop rate may include the amount of dropped SDUs or PDUs in L2 entity over the total amount of SDUs or PDUs received from gateway (i.e. MBMS GW) within a period.

3) Channel state information (CSI) or reformed CSI information related feedback

In step S420, upon receiving the feedback information from the corresponding eNBs, the MCE decides the new cell cluster (e.g., CoMP set) by taking the feedback information into account. Accordingly, the new time/frequency resource pattern and/or MCS for the corresponding cells may be determined. The MCE may notify the corresponding eNBs of the new cell cluster (e.g., CoMP set) if it is changed.

In step S430, upon deciding the new cell cluster and/or new time/frequency resource pattern and/or MCS, the MCE transmits the MBMS scheduling information to the corresponding eNBs. The MBMS scheduling information may include at least one of updated time/frequency resource pattern & MCS for the selected cells, information on SC-MCCH (G-RNTI, TMGI DRX information), or information on or PMCH.

Figure 8:
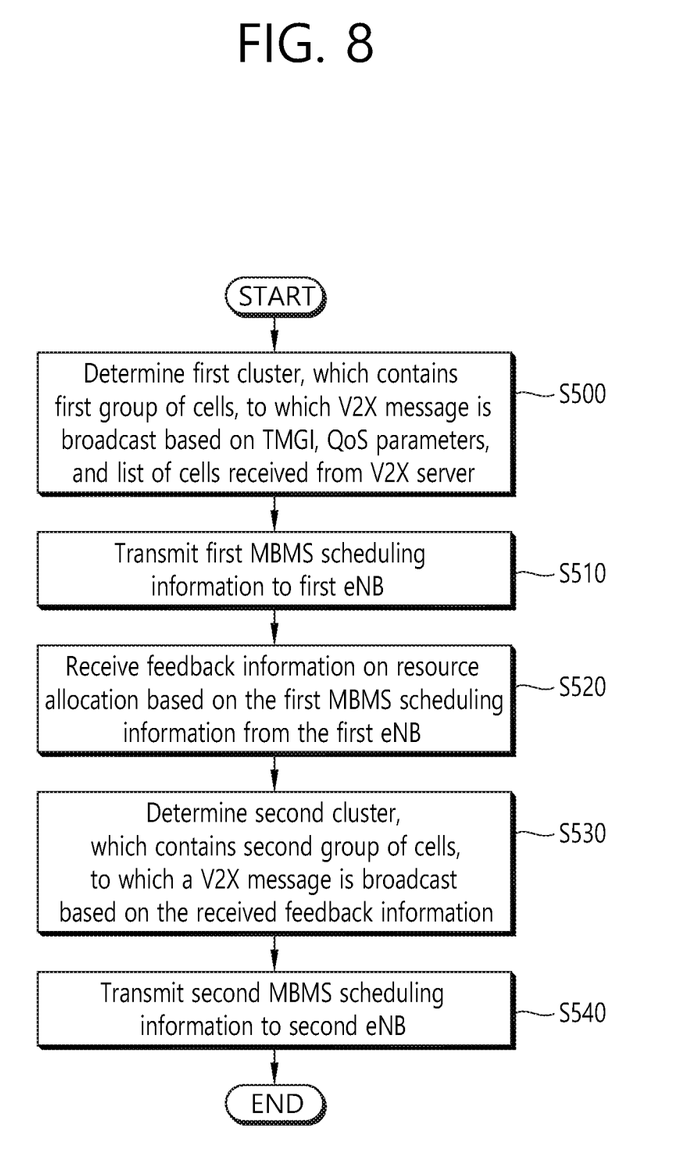
FIG. 8 shows a method for updating a cluster to which a V2X message is to be transmitted by MCE according to an embodiment of the present invention.

FIG. 8 shows a method for updating a cluster to which a V2X message is to be transmitted by MCE according to an embodiment of the present invention. The present invention described in FIG. 7 may be applied to this embodiment.

In step S400, the MCE determines a first cluster, which contains a first group of cells, to which V2X message is to be broadcast based on TMGI, QoS parameters, and a list of cells received from a V2X application server.

In step S410, the MCE transmits first MBMS scheduling information to a first eNB.

In step S420, the MCE receives feedback information on resource allocation based on the first MBMS scheduling information from the first eNB. The feedback information may include HARQ feedback information. The HARQ feedback information may include a number of received NACKs. The HARQ feedback information may include a number of failed transmissions. Further, the feedback information may include a packet drop rate measured within a period. The packet drop rate may include a number of dropped SDUs or PDUs in L2 entity over a total number of SDUs or PDUs received from a gateway within the period. The packet drop rate may include an amount of dropped SDUs or PDUs in L2 entity over a total number of SDUs or PDUs received from a gateway within the period. The feedback information may include CSI information. The feedback information may be measured per MBSFN area, per TMGI, per cluster, or per channel.

In step S430, the MCE determines a second cluster, which contains a second group of cells, to which a V2X message is to be broadcast based on the received feedback information.

In step S440, the ME transmits second MBMS scheduling information to a second eNB.

Figure 9:
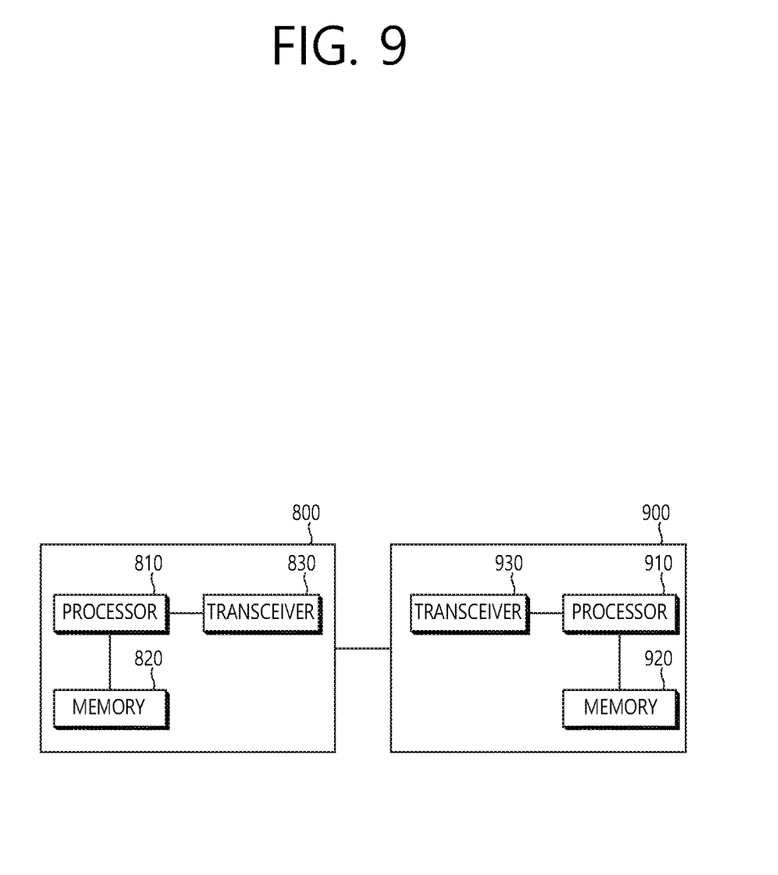
FIG. 9 shows a communication system to implement an embodiment of the present invention.

FIG. 9 shows a communication system to implement an embodiment of the present invention.

A first network 800 includes a processor 810, a memory 820 and a transceiver 830. The first network node may be MCE. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A second network node 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, the concept of DL broadcast, i.e. MBSFN/SC-PTM transmission, from different TP sets can be realized for support of V2V service from capacity point of view. Therefore, performance benefit can be obtained.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a multi-cell/multicast coordination entity (MCE), in a wireless communication system, the method comprising:
   determining a cluster, which contains a first group of cells, to which a vehicle to everything (V2X) message is to be broadcast based on a temporary mobile group identity (TMGI), quality of services (QoS) parameters, and a list of cells received from a V2X application server;
   transmitting first MBMS scheduling information to a first group of eNodeBs (eNBs), which are related to the first group of the cells;
   receiving feedback information from the first group of eNBs;
   updating the cluster to contain a second group of cells, based on the received feedback information; and
   transmitting second MBMS scheduling information to a second group of eNBs, which are related to the second group of cells,
   wherein the feedback information includes a number of received non-acknowledgements (NACKs) or a number of failed transmissions.

2. The method of claim 1, wherein the feedback information includes a packet drop rate measured within a period.

3. The method of claim 2, wherein the packet drop rate includes a number of dropped service data units (SDUs) or protocol data units (PDUs) in L2 entity over a total number of SDUs or PDUs received from a gateway within the period.

4. The method of claim 2, wherein the packet drop rate includes an amount of dropped SDUs or PDUs in L2 entity over a total number of SDUs or PDUs received from a gateway within the period.

5. The method of claim 1, wherein the feedback information includes channel state information (CSI) information.

6. The method of claim 1, wherein the feedback information is measured per multicast-broadcast single-frequency network (MBSFN) area, per TMGI, per cluster, or per channel.

* * * * *